United States Patent Office 2,964,424
Patented Dec. 13, 1960

2,964,424

BITUMEN-IMPREGNATED-FOAM PACKING MATERIAL

Laban Mast, 157C Schiedamseweg, Rotterdam, Netherlands

Filed Sept. 16, 1959, Ser. No. 840,471

Claims priority, application Netherlands June 15, 1955

9 Claims. (Cl. 117—98)

This invention relates generally to a packing material and the application is a continuation-in-part of my copending application Serial No. 591,527, filed June 15, 1956, and now abandoned.

It is an object of the invention to provide a packing material which has excellent properties or characteristics for the sealing of seams, joints and the like.

Another object of the invention is to provide a packing material having considerable elasticity when positioned in the seam, joint or the like to be sealed thereby.

A further object is to provide an elastic and water resistant packing material which is prefabricated, that is, which requires no further treatment during installation, and which has outstanding properties for packing joints between sewer pipes, expansion joints in concrete roads or other structures, and joints between building elements or panels and the like.

Still another object of the invention is to provide a packing material of the described character which has considerable elasticity when disposed in the seam, joint or the like to be sealed thereby, but which can be deformed and experiences a relatively slow return to its original shape for ease in installing the packing material within the relatively narrow joint or seam.

In accordance with an aspect of the invention, a prefabricated packing material for sealing seams, joints and the like consists of an elastic plastic body having a foam structure defined by thin walls around open pores, and bitumen which is solid and non-tacky at room temperature and which is present in an amount ranging from approximately 55 parts, by weight, of bitumen to approximately 45 parts, by weight, of the elastic plastic body, to 90 parts, by weight, of bitumen to approximately 10 parts, by weight, of the elastic plastic body, with the bitumen forming merely a coating on the thin walls of the foam structure of the plastic body and leaving the pores of the latter unfilled in order to retain the elasticity of the plastic body.

Figure 1:
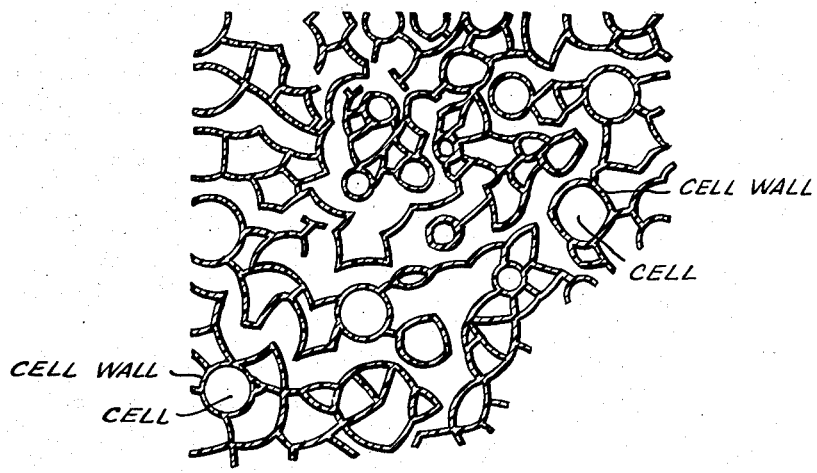
Figure 2:
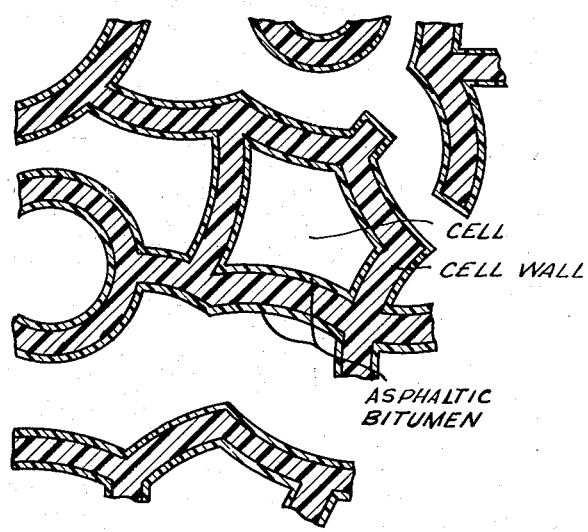

The above, and other objects, features and advantages of the invention, will be apparent in the following detailed description of illustrative embodiments thereof which is to be read in connection with the accompanying drawing, forming a part hereof, and wherein:

Fig. 1 is a diagrammatic, fragmentary view of a piece of polyurethane foam used as a starting material in producing a packing in accordance with the present invention; and Fig. 2 is an enlarged fragmentary view of a portion of the material of Fig. 1 following the impregnation thereof with asphaltic bitumen.

In producing a packing material in accordance with the present invention, the starting material is preferably a plastic having a foam structure, particularly polyurethane and polyvinyl products, but other materials having a foam structure obtained from viscose and the like may be used. The foam structure of the starting material has open pores or cells in at least its outer layers, but it is preferable, in many cases, that the body of plastic foam have such open pores or cells throughout so that the surfaces of the pores or cells in the entire body of plastic foam may be coated with the impregnating substance.

The plastic foam may be cut or otherwise formed to the desired shape either before or after the impregnation thereof, the latter being particularly the case when the plastic foam has open pores or cells throughout so that the impregnating substance can penetrate the entire starting material.

The impregnating substance is bitumen, preferably asphaltic bitumen, of which a dispersion or solution is formed having a suitably high fluidity to ensure thorough impregnation of the plastic foam.

The plastic foam constituting the starting material may be impregnated with the bitumen by passing the same over rollers through a vessel containing the solution or dispersion of the bitumen, and then squeezing out the impregnated material in order to remove the excess solution or dispersion, for example, by passing the impregnated material between squeezing or pressing rollers, so that the bitumen remaining within the plastic foam is only sufficient to coat the surfaces of the open pores or cells and does not fill the latter. Finally, the impregnated material is suitably dried.

The properties of the prefabricated packing material produced in the above described manner may be determined or controlled by regulating the concentration of the bitumen in the dispersion or solution, by selection of the structure of the plastic foam, and by regulating the length of time during which the plastic foam is submerged in the dispersion or solution, as well as by controlling the squeezing pressure employed for removing the excess solution or dispersion from the impregnated material.

The particular bitumen employed for impregnation of the plastic foam is determined by the use to be made of the prefabricated packing material, for example, the prevailing temperatures of the area in which the packing material is to be used. Thus, in order to ensure that the bitumen of the prefabricated packing material will be solid and non-tacky at the prevailing temperatures of use, the melting point of the bitumen may be between 20° C. and 60° C., but, in most cases, an asphaltic bitumen having a melting point of approximately 35° C. is preferred.

The invention will now be further illustrated with reference to the following specific examples thereof:

*Example 1*

A packing material which is particularly suited for use in water and airtight joints of casings or the like subjected to pressures of 10 atmospheres or more is obtained by completely impregnating a body of polyurethane having a foam structure with open pores or cells throughout with an emulsion of asphaltic bitumen. The emulsion consists of a mixture of at least two kinds of straight-run asphaltic bitumen having a low softening traject and a high penetrating value, for example, 80/100 and 180/200, which is dispersed in water with the aid of bentonite as an emulsifier. The emulsion used for impregnation is prepared by further diluting a dispersion which contains about 60%, by weight, of asphaltic bitumen so that the impregnating emulsion has a fluidity which is suitable for that purpose. The plastic foam is led through a vessel containing the above described emulsion and remains in the latter for a time sufficient to ensure the complete impregnation of the plastic foam. Thereafter, the impregnated plastic foam is squeezed between rollers in order to remove the excess emulsion and, after drying of the impregnated material a packing material is obtained which, as shown in Fig. 2, has asphaltic bitumen coating the surfaces of the open pores or cells, while avoiding the filling of the latter. The completed packing material prepared in the above described manner contains approximately 81 parts, by weight, of asphaltic bitumen to 18 parts, by weight, of the plastic foam. Such packing material is easily compressible and is not tacky at room temperature while adhering somewhat to stone, concrete and other similar rough surfaces.

When a band of the above described packing material having a thickness of 1.5 centimeters is compressed to a thickness of only several millimeters and then released, the band eventually returns to its original shape or dimensions. Further, it will be apparent that, when the described packing material is more or less compressed, at least some of the open pores or cells thereof are made to collapse and thereby close the passages therethrough in order to render the packing material impervious to liquids or gases. Thus, when a joint between sewer pipes is packed with the described packing material, such joint is perfectly tight, even under a liquid pressure equivalent to the head of 4 meters of water.

*Example 2*

A packing material having the same proportions and characteristics as that described in Example 1 may be prepared from a solution, rather than an emulsion, of asphaltic bitumen. The same method and apparatus are used as have been described in Example 1, with the exception that the impregnating vessel through which the plastic foam is initially led contains a solution of asphaltic bitumen in benzene. The asphaltic bitumens make up approximately 60% of the weight of the solution, and are a mixture of at least two kinds of straight-run asphaltic bitumen having a low softening traject and a high penetrating value, for example, 80/100 and 180/200.

Gasoline, solvent naphtha and other suitable solvents have been used in place of the benzene of Example 2 to produce the same packing material.

The following Examples 3 to 7 demonstrate how the starting materials, method and apparatus of Example 1 or Example 2 can be used to produce various packing materials which are especially adapted for particular purposes.

*Example 3*

A packing material which is also suitable for heavy duty applications, for example, in sealing joints which are to be water and airtight under pressures of 10 atmospheres or more, is prepared in the manner indicated in Example 1 or in Example 2 with the same emulsion or solution, respectively, but, by squeezing a lesser amount of the excess emulsion or solution out of the impregnated plastic foam, there is obtained a packing material consisting of 87 parts, by weight, of bitumen to 13 parts, by weight, of the plastic foam.

*Example 4*

A packing material suitable for providing liquid-tight joints under pressures up to 2 atmospheres is prepared in the manner described in Example 1 or Example 2 with the same emulsion or solution, respectively, but, by squeezing a greater amount of the excess emulsion or solution out of the impregnated foam, there is obtained a packing material consisting of 80 parts, by weight, of bitumen to 20 parts, by weight, of the plastic foam. A packing material for the above use is also prepared in the same manner and consists of 76 parts, by weight, of bitumen, to 24 parts, by weight, of the plastic foam.

*Example 5*

Packing materials suitable for providing liquid-tight joints under pressures up to 0.5 atmosphere are prepared in the manner indicated in Example 1 or in Example 2 with the same emulsion or solution, respectively, but, by squeezing greater amounts of the excess emulsion or solution out of the impregnated plastic foam, there are obtained packing materials which, in dried condition consist of 75 parts, by weight, of bitumen to 25 parts, by weight, of plastic foam; and 71 parts, by weight, of bitumen to 29 parts, by weight, of plastic foam, respectively.

*Example 6*

Packing materials suitable for providing liquid-tight joints subjected to little or no pressure are prepared in the manner indicated in Example 5, but with still stronger squeezing, so that the final products consist of 70 parts, by weight, of bitumen to 30 parts, by weight, of the plastic foam; and 61 parts, by weight, of bitumen to 39 parts, by weight, of the plastic foam, respectively.

*Example 7*

Packing materials suitable for use in joints between building elements, such as, panels, slabs, beams and the like of concrete, steel, wood or other materials, are prepared in the manner indicated in Example 5, but with still stronger squeezing, so that the final products consist of 60 parts, by weight, of bitumen to 40 parts, by weight, of plastic foam; and 55 parts, by weight, of bitumen, to 45 parts, by weight, of plastic foam.

Since the bitumen of the prefabricated packing materials embodying the invention is solid at the normal temperatures of use, the bitumen remains affixed to the plastic foam and cannot cause staining or streaking of the structure having the joint sealed with such packing material. Further, packing materials embodying the invention are fully plastic, possess considerable elasticity, and retain these properties permanently so that the packing materials can, at all times, follow the relative movements of the structural parts. Further, the prefabricated packing materials, when suitably compressed in a joint, form a perfect and permanent bond with all kinds of building materials and are fully resistant to the effects of weather, to low and high temperatures and to the action of chemicals.

Although the packing materials embodying the invention are fully elastic, and, following compression, tend to return to the original shape, the packing material can be made so as to have a relatively slow return to original shape, whereby the packing material can be initially compressed for ease in installation in a relatively narrow joint with the intention that the packing material will slowly return towards its original shape within the joint for achieving an effective seal of the latter.

Since the bitumen forms an integral part of the packing material and is solid or non-tacky under normal temperatures, such packing materials can be neatly installed, as contrasted with conventional packing materials which have bitumen, in liquid form, applied thereto at the time of installation in the joint.

Although illustrative examples of packing materials embodying the invention have been described in detail herein, it is to be noted that the invention is not limited to such specific examples, and that various other packing materials may be prepared without departing from the scope or spirit of the invention, except as defined in the appended claims.

What is claimed is:

1. A prefabricated packing material for sealing joints consisting of an elastic plastic body having a foam structure defined by thin walls around open pores, and bitumen which is solid and non-tacky at room temperatures and which represents approximately 55% to 90%, by weight, of the packing material, said bitumen forming merely a coating on said thin walls of the foam structure of said plastic body and leaving said pores unfilled in order to retain the elasticity of said plastic body.

2. A prefabricated packing material for sealing joints consisting of an elastic plastic body having a foam structure defined by thin walls around open pores, and asphaltic bitumen which is solid and non-tacky at room temperatures and which represents approximately 55% to 90%, by weight, of the packing material, said bitumen forming merely a coating on said thin walls of the foam structure of said plastic body and leaving said pores unfilled in order to retain the elasticity of said plastic body.

3. A prefabricated packing material as in claim 2; wherein said bitumen has a melting temperature between 20° C. and 60° C.

4. A prefabricated packing material as in claim 2; wherein said bitumen has a melting temperature of 35° C.

5. A prefabricated packing material as in claim 2; wherein said bitumen represents from 55% to 60%, by weight, of the packing material so that the latter is particularly suited for use in the joints of building structures.

6. A prefabricated packing material as in claim 2; wherein said bitumen represents from 61% to 70%, by weight of the packing material so that the latter is suitable for providing liquid-tight seals in joints subjected to relatively little pressure.

7. A prefabricated packing material as in claim 2; wherein said bitumen represents from 71% to 75%, by weight, of the packing material so that the latter is suitable for providing liquid-tight seals in joints subjected to pressures up to one-half atmosphere.

8. A prefabricated packing material as in claim 2; wherein said bitumen represents from 76% to 80%, by weight, of the packing material so that the latter is suitable for providing liquid-tight seals in joints subjected to pressures up to 2 atmospheres.

9. A prefabricated packing material as in claim 2; wherein said bitumen represents from 81% to 87%, by weight, of the packing material so that the latter is suitable for the liquid and airtight sealing of joints subjected to pressures of at least 10 atmospheres.

References Cited in the file of this patent

UNITED STATES PATENTS

| | | |
|---|---|---|
| 2,219,289 | Bennett | Oct. 29, 1940 |
| 2,354,430 | Greenup et al. | July 25, 1944 |
| 2,389,761 | Burgeni | Nov. 27, 1945 |
| 2,431,385 | Fischer | Nov. 25, 1947 |
| 2,711,769 | Abig | June 28, 1955 |

FOREIGN PATENTS

| | | |
|---|---|---|
| 578,404 | Great Britain | June 27, 1946 |